US009049733B2

(12) United States Patent
Subramanian et al.

(10) Patent No.: US 9,049,733 B2
(45) Date of Patent: Jun. 2, 2015

(54) SYNCHRONOUS TRANSMISSION METHODS AND APPARATUS

(75) Inventors: Sundar Subramanian, Somerville, NJ (US); Shihuan Liu, Ames, IA (US); Xinzhou Wu, Monmouth Junction, NJ (US); Thomas J. Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 13/542,106

(22) Filed: Jul. 5, 2012

(65) Prior Publication Data

US 2013/0010774 A1  Jan. 10, 2013

Related U.S. Application Data

(60) Provisional application No. 61/505,468, filed on Jul. 7, 2011, provisional application No. 61/505,465, filed on Jul. 7, 2011.

(51) Int. Cl.
*H04Q 7/24* (2006.01)
*H04W 72/12* (2009.01)
*H04W 74/08* (2009.01)
(Continued)

(52) U.S. Cl.
CPC .......... *H04W 72/12* (2013.01); *H04W 74/0808* (2013.01); *H04W 76/00* (2013.01); *H04L 69/161* (2013.01)

(58) Field of Classification Search
CPC . H04W 72/12; H04W 74/0808; H04W 76/00; H04I 69/161
See application file for complete search history.

(56) References Cited

U.S. PATENT DOCUMENTS 7,266,085 B2   9/2007  Stine
7,274,708 B2   9/2007  Benveniste
7,286,474 B2 * 10/2007  Garg et al. .................... 370/230
(Continued)

FOREIGN PATENT DOCUMENTS

WO   2009074949 A2   6/2009
WO   2011014231 A1   2/2011

OTHER PUBLICATIONS

Anonymous, "An Adaptive Back-Off Control Method for 802.11 Wireless LAN," Disclosure No. IPCOM000151224D, Apr. 21, 2007, 2 pages.
Siwamogsatham, "Improving CSMA for WLANs via Piggybacking and Scheduled Backoff Mechanisms," Future Generation Communication and Networking (FGCN 2007), Dec. 6-8, 2007, vol. 1, pp. 557-563.
(Continued)

*Primary Examiner* — Hassan Phillips
*Assistant Examiner* — Prenell Jones
(74) *Attorney, Agent, or Firm* — James K. O'Hare

(57) ABSTRACT

Methods and apparatus for use in a wireless system are described where initiation of packet transmission is constrained in accordance to control actual packet transmission in a manner that reduces contention and possible collisions beyond that provided by lower layer resource contention mechanisms, e.g., 802.11 carrier sensing and/or transmission back-off timing mechanisms. Through higher level, e.g., MAC constraints, on packet transmission initiation, an air interface which employs carrier sensing can be used and controlled in a manner which reduces collisions and interference in applications where small packets, e.g., packets which can be transmitted in a fraction of the maximum permitted transmission time. The methods allow small packets in such systems to be transmitted on a periodic or semi-periodic basis in many cases.

20 Claims, 9 Drawing Sheets

(51) Int. Cl.
*H04W 76/00* (2009.01)
*H04L 29/06* (2006.01)

(56) References Cited

U.S. PATENT DOCUMENTS

| | | | |
|---|---|---|---|
| 7,664,031 | B2 | 2/2010 | Davis |
| 7,907,627 | B2 | 3/2011 | Yang et al. |
| 2004/0008627 | A1* | 1/2004 | Garg et al. ............... 370/235 |
| 2004/0100936 | A1 | 5/2004 | Liu et al. |
| 2009/0279427 | A1* | 11/2009 | Ji et al. ............... 370/230 |
| 2009/0323716 | A1 | 12/2009 | Chintalapudi et al. |
| 2010/0157967 | A1* | 6/2010 | Sakoda ............... 370/338 |
| 2010/0165963 | A1 | 7/2010 | Chu et al. |
| 2011/0110340 | A1 | 5/2011 | Lakkis |
| 2013/0064236 | A1* | 3/2013 | Ji et al. ............... 370/338 |
| 2013/0176856 | A1 | 7/2013 | Wang et al. |
| 2013/0287043 | A1* | 10/2013 | Nanda et al. ............... 370/467 |

OTHER PUBLICATIONS

Chang, Y., et al., "Goodput Enhancement of VANETs in Noisy CSMA/CA Channels", IEEE Journal on Selected Areas in Communications, Jan. 1, 2011, pp. 236-249, vol. 29, No. 1, IEEE Service Center, Piscataway, US, XP011340863, ISSN: 0733-8716, DOI: 10.1109/JSAC.2011.110122.

International Search Report and Written Opinion—PCT/US2012/045852—ISA/EPO—Oct. 23, 2012.

Kumar S. et al., "Medium Access Control protocols for ad hoc wireless networks: A survey", Ad Hoc Networks, May 1, 2006, pp. 326-358, vol. 4, No. 3, Elsevier, Amsterdam, NL, XP027982415, ISSn: 1570-8705 [retrieved on May 1, 2006].

Ma et al., "An Analysis of Generalized Slotted-Aloha Protocols" IEEE/ACM Transactions on Networking, vol. 17, No. 3, pp. 936-949 (Jun. 2009).

* cited by examiner

SYNCHRONOUS TRANSMISSION METHODS AND APPARATUS

RELATED APPLICATIONS

The present application claims the benefit of the filing date of Provisional Patent Application Ser. No. 61/505,465, filed Jul. 7, 2011, titled "METHODS AND APPARATUS FOR FACILITATING CHANNEL ACCESS IN A COMMUNICATION SYSTEM" and claims the benefit of the filing date of Provisional Patent Application Ser. No. 61/505,468, filed Jul. 7, 2011, titled "SYNCHRONOUS TRANSMISSION METHODS AND APPARATUS" both of which are assigned to the assignee of the present application and both of which are hereby expressly incorporated by reference in their entirety.

FIELD

The present application relates to methods and apparatus for synchronizing transmissions in a communications system, e.g., in an ad hoc or other system, which may use a randomized back-off and/or carrier sensing.

BACKGROUND

In various communications systems, carrier sensing alone or in combination with a randomized back-off transmission time technique is used to determine when a device will transmit on a physical communications channel.

Consider, for example, 802.11 based systems. In a typical 802.11 based system, a broadcast packet is transmitted on a channel based on a DCF (distributed coordination function) mechanism. The system may include multiple nodes. Each node maintains a back-off counter used in determining when the node may transmit data within an overall time interval in which devices may transmit data signals to one another. The back-off counter is initialized to zero.

Each node that wishes to broadcast senses the channel and transmits if the channel is sensed to be idle for more than a duration known as DIFS and its back-off counter has expired. After each transmission, the nodes pick a new back-off counter. If the back-off counter value expires before the next packet arrives, the device can transmit after sensing the channel to be idle for a DIFS duration. (If the previous reception is unsuccessful, the device needs to wait for EIFS).

Typical drawbacks with this scheme are that all the waiting nodes with zero back-off counter choose to transmit at the same time when the channel becomes idle. Even if all waiting nodes have non-zero random back-off, the probability that 2 transmitters transmit at the same time is high (this can occur when two transmitters choose the same back-off), when the node density is high. Note that the spatial configuration of concurrent transmitters are not controlled by any protocol, i.e., the locations of the colliding transmitters can be arbitrary. This further leads to poor performance in receiving the broadcasting messages, especially in a dense deployment.

In view of the above discussion it should be appreciated that there is a need for improved methods of controlling when and/or how devices contend for transmission resources. In particular, it would be desirable if methods and apparatus which facilitate synchronized transmissions could be developed which could be used for one or more applications in a system which supports the use of carrier sensing.

SUMMARY

Initiation of packet transmission is constrained in accordance with various features to control actual packet transmission in a manner that reduces contention and possible collisions beyond that provided by lower layer resource contention mechanisms, e.g., 802.11 carrier sensing and/or transmission back-off timing mechanisms. Through higher level, e.g., MAC constraints, on packet transmission initiation, a conventional air interface can be used and controlled in a manner which reduces collisions and interference in applications where small packets, e.g., packets which can be transmitted in a fraction of the maximum permitted transmission time, are transmitted on a periodic or semi-periodic basis. Examples of applications where the methods and apparatus of the present invention are particularly well suited are applications where mobile systems, e.g., automobiles, aircraft, etc., routinely broadcast device location updates so that other systems in the area can be aware of the device's position, speed, and/or direction of travel, etc., and adjust their own position, speed and/or direction of travel to maintain suitable device spacing requirements on a roadway or in the air.

By imposing packet transmission initiation constraints at the MAC or application layer, airlink resources are effectively divided, for at least some applications, into multiple distinct sets of resources with the physical or other lower level layer determining, e.g., through contention based resource mechanisms, which particular physical resource is used to transmit a packet.

Thus, a conventional standard compliant device, e.g., a device complying with one or more of the 802.11 standards, can be controlled in a manner that improves airlink contention for particular applications.

In accordance with one feature, a set of recurring packet transmission initiation intervals is determined to correspond to a data transmission time period including multiple packet transmission opportunities, e.g., a recurring broadcast interval. The actual time of a packet transmission opportunity may vary depending on airlink utilization by one or more devices, i.e., when another device ends a packet transmission. However, the transmission initiation intervals recur over time without regard to when actual packet transmission occurs. Thus, the packet transmission initiation intervals appear as a recurring set of time intervals which recur in a predictable manner.

The use of a transmission initiation interval timing structure, imposed on top of a basic 802.11 timeline, in accordance with various features allows for additional constraints to be placed on packet transmission.

In accordance with one feature, a device selects a subset of packet transmission initiation intervals to be associated with it and then limits initiation of packet transmission to those intervals. By selecting a subset of the packet initiation intervals, potential for collisions is reduced as compared to systems where all devices are allowed to contend for resources during all time periods.

Furthermore, in some embodiments, packet transmission length is intentionally limited to sizes which can be transmitted in a fraction of the amount of time the physical layer allows a single device to continuously transmit, e.g., in an amount of time which is equal to or less than the duration of a packet transmission initiation interval. This increases the probability that multiple devices will be able to successfully transmit small packets at short intervals on a regular, e.g., periodic or semi-periodic basis.

To reduce the probability of collisions, in some embodiments a device monitors airlink resources for a period of time prior to selecting a subset of transmission initiation intervals. Received signal energy provides a reasonable indication of amount of airlink resource utilization during the monitoring period. In some embodiments, the selected subset of packet transmission initialization intervals is selected to include the one or a few of the airlink transmission initiation intervals corresponding to the time periods in which low signal energy was detected as compared to other time periods in which higher signal energy was detected.

The methods and apparatus of the present invention are particularly well suited for use by devices which frequently exchange small amounts of information, e.g., automobiles transmitting location, speed and/or other information on a regular basis. Since the methods and apparatus of the present invention do not require changes to the lower layer resource contention mechanisms, they do not interference with other devices, e.g., other 802.11 devices, using the same lower layer resource contention mechanisms to communicate information corresponding to other applications.

The methods and apparatus described herein are particularly well suited for applications where groups of devices in near proximity, e.g., on a highway or congested travel area, are likely to operate in the same manner thereby increasing the likelihood that subsets of devices will be competing for resources in different packet transmission initiation time periods.

Packet transmission initiation intervals, are a timing structure that imposed on top of a recurring broadcast interval. The packet transmission initiation intervals, are synchronized between communications devices within communication range of each other. Beacon signaling and/or other synchronization techniques may be used to achieve synchronization of the recurring beacon intervals and corresponding recurring packet transmission initialization intervals.

In accordance with one feature of the invention, the combination of: i) the spacing between selected transmission initiation intervals which a communications device may use and ii) the presence of a null transmission period following each packet transmission, ensures that a communication's device's back-off transmission counter will be zero each time a packet transmission is initiated. The presence of the null transmission period further ensures that the carrier sensing operation will detect that the carrier is not in use at the time the carrier sensing operation is performed in response to initiation of a packet transmission operation. The length of the null may vary depending on the embodiment and may result in the back-off transmission counter of devices being decremented one or multiple times depending on the length of the null corresponding to each packet initialization interval.

By imposing the above discussed constraints and recurring transmission initiation interval timing structure on top of a recurring broadcast transmission timing structure, devices can be operated in a synchronous manner despite the use of a transmission timing back-off and carrier sensing as part of transmission control process.

An exemplary method of operating a communications device to transmit packets in accordance with one embodiment comprises: storing information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities; selecting a subset of transmission initiation intervals to be associated with said communications device; and restricting initiation of packet transmission to transmission initiation intervals associated with said communications device, said transmission initiation intervals associated with said communications device being separated from one another in time by at least N transmission initiation intervals, N is a non-zero integer value.

An exemplary communications device in accordance with one embodiment comprises: at least one processor configured to: store information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities; select a subset of transmission initiation intervals to be associated with said communications device; and restrict initiation of packet transmission to transmission initiation intervals associated with said communications device, said transmission initiation intervals associated with said communications device being separated from one another in time by at least N transmission initiation intervals, N being a non-zero integer value. In some embodiments the exemplary communications device further includes a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
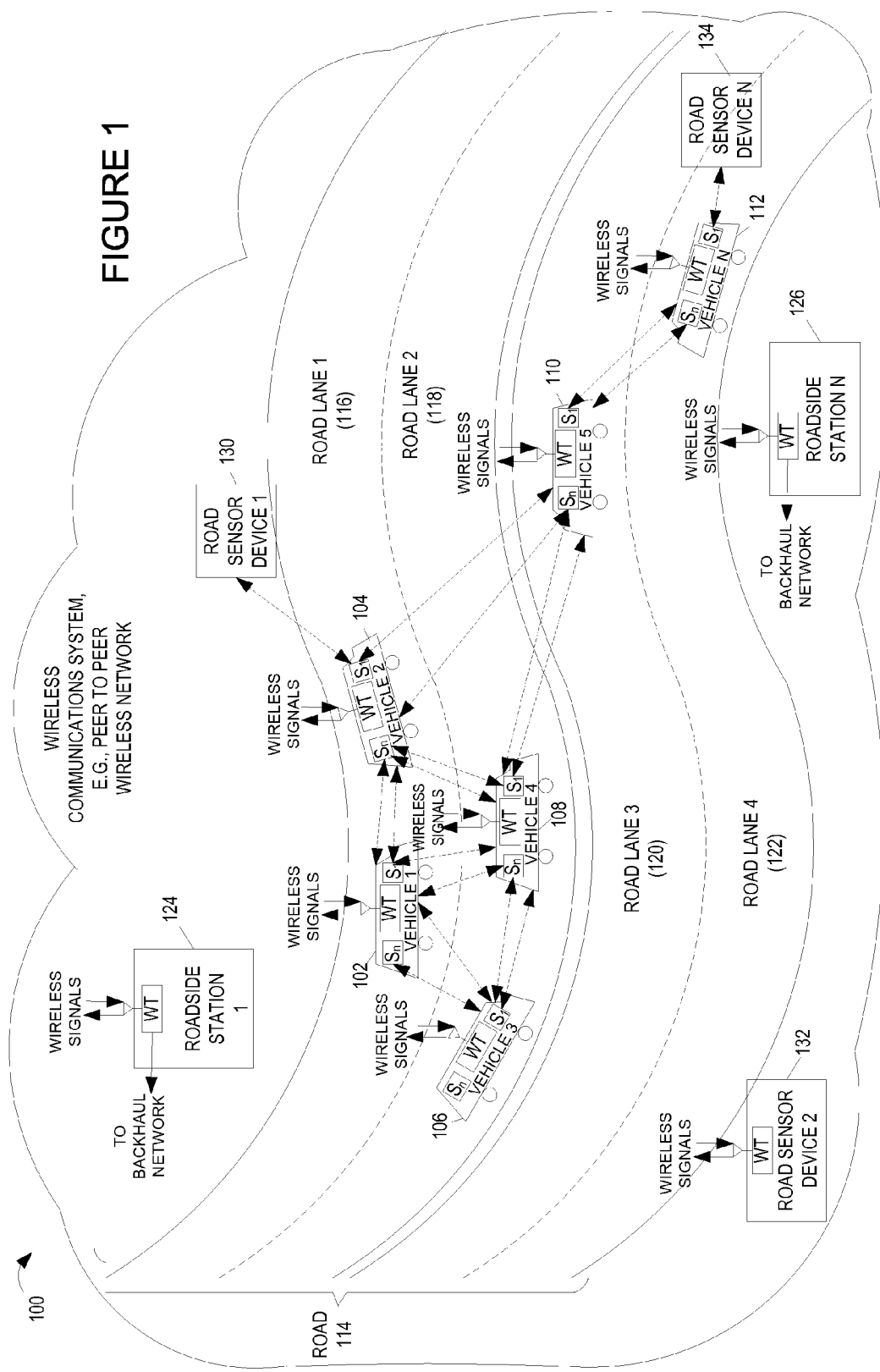
FIG. 1 is drawing of an exemplary wireless communications system, e.g., a peer to peer wireless network, in accordance with various embodiments.

In various embodiments, a hierarchical synchronous periodic channel structure on the existing MAC timeline is imposed. In accordance with one aspect of some embodiments, the resources are divided into K sub-resources (for example, this could be a sequence of time-slots or combination of time-slot/frequency band combinations) and each device chooses a preferred sub-resource in which he will contend for the channel. Thus in accordance with one aspect of various embodiments a communications channel is divided into K periodically recurring time slots which are called the packet transmission initiation intervals.

The choice of the preferred sub-resource could be made by observing the occupancies in the past, and identifying resources that are least in conflict. Such resources can be identified by monitoring the channel and measuring the amount of energy observed in the resource.

Within these resources, the nodes still contend using their existing standards such as 802.11p. Since the choice of sub-resources are made in a semi-static manner, the nodes that transmit together are spatially spread apart in a uniform manner. Also, the concurrent channel access probability is also reduced because the nodes wait until their sub-resource's time, e.g., until the arrival of the selected transmission interval. This has the property of evenly spreading out the channel access times across the whole duration.

The length of each packet transmission initiation interval is determined in some embodiments by the transmission time of a typical broadcasting packet (for example, 300 bytes in 802.11p)+EIFS+a small guard time. The EIFS durations are intentionally left empty to enable transmissions at the beginning of the next selected transmission initiation interval. The above mentioned small guard time is required to guarantee that the non-zero back-off counters are deterministically decreased in each transmission initiation interval. In accordance with one aspect of another embodiment, the guard intervals are only present in a subset of the transmission initiation intervals.

The choice of the preferred sub-resource (transmission initiation interval) is made in some embodiments based on the observed occupancies, e.g., use of the transmission initiation intervals in the past, and, optionally, further identifying transmission resources, e.g., tone-symbols, within the transmission initiation interval that are least in conflict. Such resources can be identified by means of the amount of energy observed in the resource in recent history, e.g., during the monitoring interval. Such a transmission interval selection strategy is sometimes referred to as the listen-and-pick protocol.

When a node receives a packet to broadcast, e.g., from an application, it waits until it's preferred, i.e., selected transmission initiation interval, occurs in the recurring timing structure. In the selected transmission initiation interval, the packet is injected into the MAC at the very beginning of the slot thereby initiating packet transmission and the process relating to transmission resource contention for resources to transmit the packet. In some embodiments the device uses the 802.11p based channel access mechanism for transmission resource contention purposes and obtains access to the channel. Due to the design of the transmission initiation interval structure in which the packet transmission occurs, nodes will have depleted their back-off counters when the packet is injected into the MAC queue. Once the packet is provided to the MAC layer for transmission at the beginning of the transmission initiation interval, the device does not have to wait for further decrementing of the back-off counters. The device waits for EIFS/DIFS sensing, i.e., performs channel sensing for an EIFS/DIFS time period to ensure that the channel remains unoccupied for an EIFS/DIFS time period, before actual packet transmission. Thus only the nodes that choose the same transmission initiation interval as their preferred transmission interval end up transmitting concurrently. The features of various embodiments described herein allow an asynchronous MAC to operate like a synchronous MAC, thus deriving the benefits of synchronous MAC. This is achieved through the control of packet transmission initiation timing in the above described manner.

As compared to the 802.11p MAC without the exemplary transmission initiation interval timing structure and the synchronous packet injection at the slot boundaries in accordance with various embodiments as described herein, the methods described herein controls the set of devices operating in accordance with the exemplary method, to transmit simultaneously. Various features of the exemplary listen-and-pick protocol facilitate maximum geographic separation between nodes sharing the transmission resources. This can further improve the performance of the 802.11p broadcast protocol, namely the number of devices discovered and probability of discover in physical proximity.

In accordance with various embodiments, the communications device uses a combination of carrier sensing and a transmission back-off counter to determine if it can proceed with a packet transmission at a point in time. In various embodiments, packet transmission initiation is restricted to a set of transmission initiation intervals which are selected by the communications device, e.g., based on past occupancy. In one such embodiment, when a packet transmission is initiated during a broadcast interval the communications device performs a carrier sensing operation. The carrier sensing operation determines whether the carrier is being used at the time of the sensing operation by another device, e.g., for a packet transmission. A transmission decision is made based on the output of the carrier sensing operation and a current value of a transmission back-off counter maintained by the communications device.

If the carrier sensing operation indicates that the carrier is not being used by another device, it checks the value of its transmission back-off counter. If the value of transmission back-off counter is zero, transmission proceeds. However if the back-off counter is non-zero, carrier sensing is continued and the transmission back-off counter is decremented by one for each time the carrier remains unused for a predetermined amount of time, e.g., sometimes referred to as a slot time, following an unused DIFS or unused EIFS period. When the back-off counter reaches zero, the transmission of the packet proceeds. The features of various embodiments and design and structure of the exemplary transmission initiation interval ensures that the devices will have depleted their back-off counters when the device's selected transmission initiation interval arrives. The exemplary small guard time in the transmission initiation intervals guarantees that the non-zero back-off counters are deterministically decreased in each transmission initiation interval.

At the beginning of the transmission initiation interval, the data to be transmitted in a packet is provided to the MAC layer for transmission and packet transmission occurs after the device senses that channel has been unoccupied for an EIFS/DIFS time period.

The DIFS period is used when a packet was successfully received immediately prior to the DIFS period. An EIFS period is used if receipt of a packet failed, e.g., there was a reception error, immediately prior to the EIFS period. After transmission of the packet, a new transmission back-off value is selected and the countdown proceeds by decrementing the counter value as discussed previously.

Thus the features of various embodiments ensure that the transmission back-off counter value is zero when the transmission initiation interval arrives. The exemplary packet transmission initiation intervals, are a timing structure that are imposed on top of the recurring broadcast interval. The packet transmission initiation intervals are synchronized between communications devices within communication range of each other. Beacon signaling and/or other synchronization techniques may be used for active synchronization of the recurring beacon intervals and corresponding recurring packet transmission initialization intervals.

In accordance with one feature of some embodiments, the combination of: i) the spacing between transmission initiation intervals which a communications device may use and ii) the presence of a null transmission period following each packet transmission, ensures that a communication's device's transmission back-off counter will be zero each time a packet transmission is initiated. The presence of the null transmission period, e.g., introduced in the transmission initiation intervals as the guard time, further ensures that the carrier sensing operation will detect that the carrier is not in use at the time the carrier sensing operation is performed in response to initiation of a packet transmission operation. The length of the null may vary depending on the embodiment and may result in the transmission back-off counter of devices being decremented one or multiple times depending on the length of the null corresponding to each packet initialization interval.

Thus it should be appreciated that in accordance with one aspect of some embodiments, by imposing the above discussed constraints and recurring transmission initiation interval timing structure on top of a recurring broadcast transmission timing structure, devices can be operated in a synchronous manner despite the used of a transmission timing back-off and carrier sensing as part of transmission control process.

FIG. 1 is drawing of an exemplary wireless communications system 100, e.g., a peer to peer wireless network, in accordance with various embodiments. The system 100 of FIG. 1 includes a plurality of vehicles (vehicle 1 102, vehicle 2 104, vehicle 3 106, vehicle 4 108, vehicle 5 110 . . . , vehicle N 112) located at different positions on a multi-lane road 114 which includes lane 1 116, lane 2 118, lane 3 120, and lane 4 122. Each vehicle (102, 104, 106, 108, 110, 112) includes a communications device, e.g., a wireless terminal (WT), and a plurality of sensor modules (sensor $S_1$, . . . , sensor $S_n$). The system 100 of FIG. 1 also includes a plurality of roadside stations (roadside station 1 124, . . . , roadside station N 126). Each roadside station includes a wireless terminal. The wireless terminals, which may be located in vehicles and located in roadside stations communicate with one other via wireless signals, e.g., using a peer to peer signaling protocol. The wireless terminals in the roadside station, may be, and sometimes are coupled to a backhaul network.

The sensors included in the vehicles include both passive and active sensor devices. The sensor modules include, e.g., GPS modules, acceleration measurement modules, velocity measurement modules, speed measurement modules, position measurement modules, radar modules, acoustic modules, visual light spectrum modules, e.g., a camera module, infrared modules, distance measurement modules, vehicle separation modules, braking distance modules, impact avoidance modules, cruise control modules, parking modules, lane positioning modules, traffic congestion determination modules, posted speed limit determination modules.

In the system 100 of FIG. 1, there are also a plurality of road sensor devices, e.g., road sensor device 1 130, road sensor device 2 132, . . . , road sensor device N 134. In some embodiments, at least some of the road sensor devices are embedded in the road. The road sensor devices include, e.g., location markers, lane demarcation markers, edge of road markers, posted speed limit communication devices, road condition sensors, e.g., road temperature sensor, wet road condition detection sensor, icy road condition sensor, etc. In some embodiments, for at least some road sensor devices, a sensor module in a vehicle communicates with a road sensor device. In some embodiments, for at least some road sensor devices, the road sensor device includes a wireless terminal which participates in the wireless communications, e.g., in the peer to peer communications.

Figure 2:
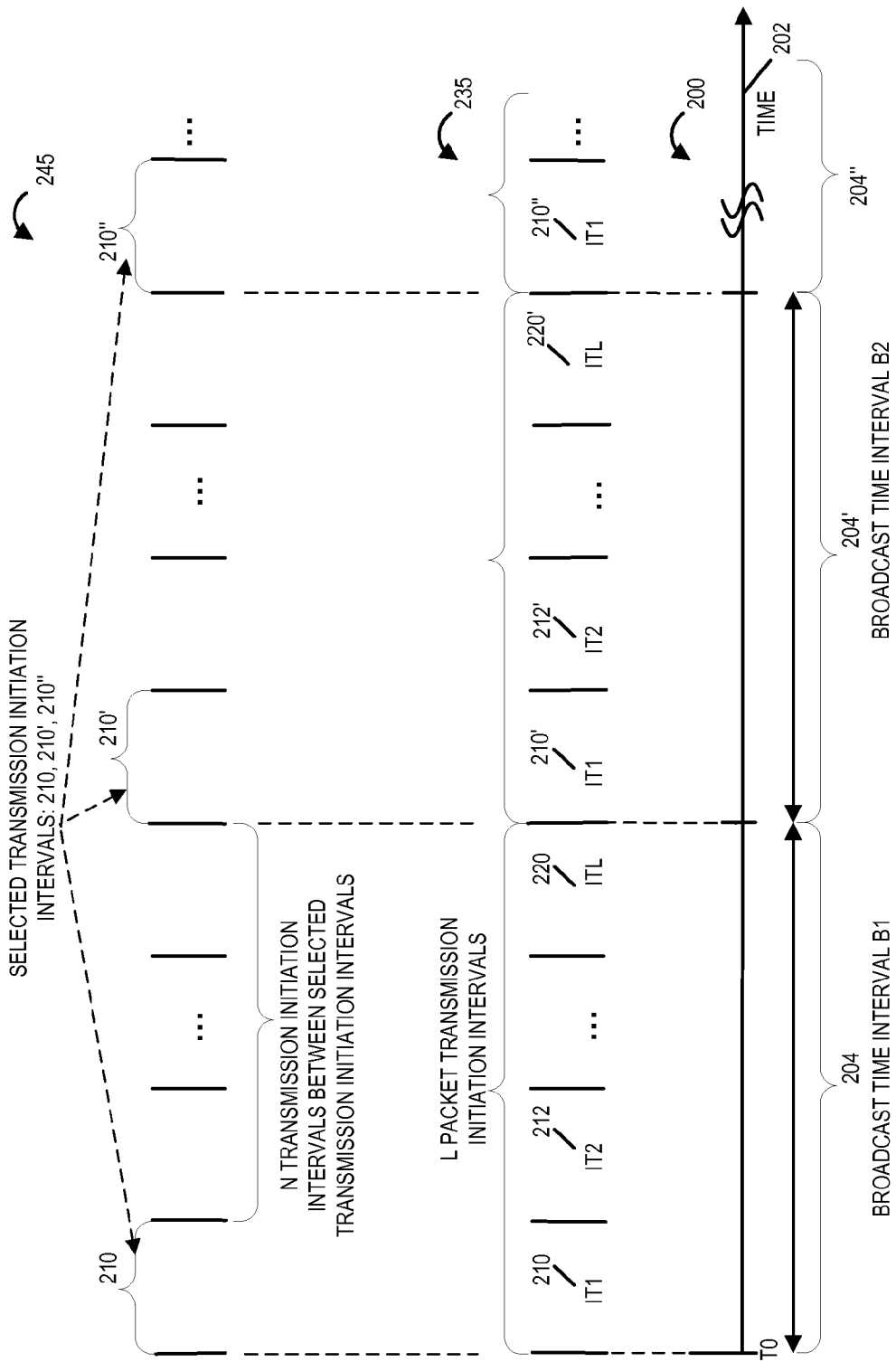
FIG. 2 illustrates an exemplary packet transmission initiation interval timing structure that is imposed on top of recurring broadcast intervals, in accordance with some embodiments.
Figure 3:
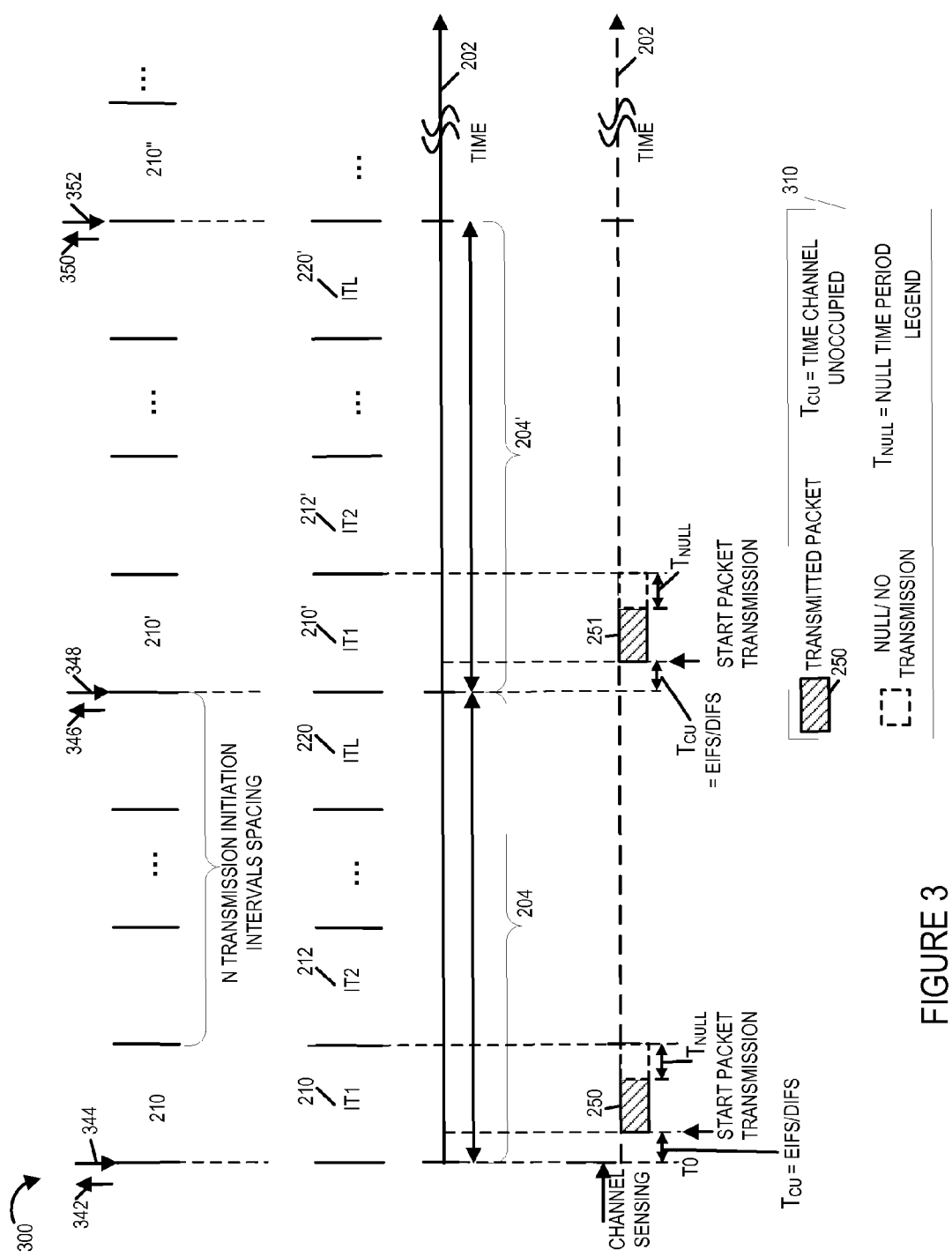
FIG. 3 illustrates an example showing packet transmission initiation in a selected subset of transmission initiation intervals, and actual packet transmission operation in accordance with an exemplary embodiment.

FIGS. 2-3 show exemplary timing diagrams in which time is represented by the horizontal axis. FIG. 2 includes drawings 200, 235 and 245. Drawing 235 illustrates an exemplary packet transmission initiation interval timing structure that is imposed on top of the recurring broadcast intervals, used by the physical layer, illustrated in drawing 200, in accordance with one aspect of various embodiments. The transmission initiation intervals and broadcast time intervals may be used in the system shown in FIG. 1 with the timing of the intervals being synchronized between devices in the exemplary communications system 100. For discussion purposes, consider that T0 indicates the beginning of the broadcast interval B1 204 in the recurring broadcast time intervals 204, 204', 204". The transmission initiation interval timing structure 235 in accordance with various features allows for additional constraints, e.g., application layer and/or MAC layer constraints, to be placed on packet transmission to reduce the potential for collisions without having to alter the timing structure used at the physical layer for transmission control and synchronization purposes. In fact, the physical layer, e.g., actual physical transmitter, need not be aware of the use of transmission initiation intervals or the constraints associated therewith which are used by the application and/or MAC layer.

The recurring broadcast intervals illustrated in drawing 200 repeat over a recurring broadcast time interval 204 with each subsequent occurrence being indicated by the use of a ' following the reference number 204. Thus recurring broadcast intervals include a plurality of recurring broadcast time intervals, e.g., 204, 204', 204", each including one or more, e.g., a plurality, of packet transmission opportunities. In accordance with one aspect of some embodiments a broadcast channel is divided into a plurality of periodically repeating channel resources, e.g., L resources. In at least some embodiments the L resources are timeslots of a communications channel, e.g., a broadcast channel. In the FIG. 2 exemplary embodiment each broadcast interval, e.g., 204, 204', is logically divided into L periodically recurring time slots which are the packet transmission initiation intervals. Each of the L recurring transmission initiation intervals corresponds to at least one packet transmission opportunity for a device. As can be appreciated from FIG. 2 example, the L transmission initiation intervals IT1 210, IT2 212, . . . , ITL 220 correspond to the broadcast time interval 204, K transmission initiation intervals IT1 210', IT2 212', . . . , ITL 220' correspond to the broadcast time interval 204', and the next L transmission initiation intervals correspond to the broadcast time interval 204" and so on.

In accordance with various embodiments a communications device that intends to transmit a packet over time, e.g., on a recurring or semi-periodic basis, selects one or more packet transmission initiation intervals during a broadcast interval to use to support the expected packet transmissions. The selection of a particular subset of transmission initiation intervals maybe, and in some embodiments is, based on a detected channel occupancy during one or more broadcast intervals during which monitoring is performed. In accordance with one feature, the selection of the subset of transmission initiation intervals, in some embodiments is, further based on the spacing between transmission initiation intervals which a communications device may use. In some embodiments the communications device is constrained to select a subset of transmission initiation intervals which are separated from one another in time by at least N transmission initiation intervals, where N is a non-zero integer value.

In accordance with one feature, the device restricts initiation of packet transmission to the selected subset of packet transmission initiation intervals associated with it, e.g., initiation intervals 210, 210', 210". By selecting a subset of the packet initiation intervals, e.g., some fraction less than all the possible packet initiation intervals in the recurring timing structure, potential for collisions is reduced as compared to systems where all devices are allowed to contend for resources during all time periods.

As an example of a transmission initiation interval selection consider that the device selects to use the first packet transmission initiation of each broadcast time interval. Note that in FIG. 2 example, the selected transmission initiation intervals are separated from one another in time by N transmission initiation intervals. In such a case, the initiation intervals which are used by the device recur at a predictable uniform spacing which is well suited for periodic transmissions. Depending on the expected or desired time between transmissions, a device may select to use multiple transmission initiation intervals during each broadcast time interval, however the separation in time between the selected transmission initiation intervals needs to be N transmission initiation intervals. In accordance with one feature of some embodiments, N is large enough to ensure that any back-off counter used by said communication device to determine a packet transmission time expires by the start of a next selected transmission initiation interval. In some embodiments N is an integer value equal to or greater than the maximum back-off counter value divided by the minimum back-off decrement which will occur in each transmission initiation interval. Thus N is chosen, at least in some embodiments, in accordance with the following equation:

$$N \geq (BC_{max})/(BD_{min})$$

where $BC_{max}$ is the maximum back-off counter value, and $BD_{min}$ is the minimum back-off decrement which will occur in each transmission initiation interval.

The minimum back-off decrement which occurs in each transmission initiation interval is also called as a slot time. Thus it should be appreciated that depending on the maximum back-off counter value and the minimum back-off decrement which occurs in each transmission initiation interval, that are chosen in an embodiment, the value of N may change.

In the FIG. 2 example, a device selects to use the first packet transmission interval in each broadcast interval. Thus, drawing 245 illustrates 3 selected packet transmission initiation intervals, e.g., packet transmission initiation intervals 210, 210', and 210".

In accordance with one feature of various embodiments, packet transmission initiation, e.g., the time at which data is provided to the transmission system for purposes of starting the process of packet transmission and/or channel access contention for purposes of transmitting a packet, is restricted by the application(s) and/or MAC functionality in a device to the selected subset of transmission initiation intervals, e.g., 210, 210', and 210".

It should be appreciated that while an application may be constrained in accordance with various features from providing data to the transmission system to start a packet transmission to the subset of transmission initiation intervals the device has selected to use, once provided with the data to be transmitted the physical layer of the transmitter will proceed with determining the actual transmission time of a packet of data based on its back-off counter and/or the carrier sensing techniques that it implements. In some but not necessarily all embodiments, 802.11p compliant carrier sensing and back-off techniques are used to determine the actual time at which a packet is transmitted during the broadcast time interval once the transmission system, e.g., physical layer, is made aware of the data waiting to be transmitted. It should be further appreciated that the structure of the exemplary transmission initiation intervals in which the packet transmission occurs implemented in accordance with various embodiments, ensures that the devices will have depleted their back-off counters when the packet is injected into the physical layer for transmission. Once the packet is provided to the MAC layer for transmission at the beginning of the transmission initiation interval, the device does not have to wait for further decrementing of the back off counters. The device waits for EIFS/DIFS sensing, i.e., performs channel sensing for an EIFS/DIFS time period to ensure that the channel remains unoccupied for an EIFS/DIFS time period, before actually transmitting the packet.

Beacon signaling and/or other synchronization techniques may be used to achieve device synchronization allowing for the devices to operate in a time synchronized manner which is consistent with timing diagram shown in FIG. 2.

FIG. 3 is a drawing 300 illustrating an example showing packet transmission initiation operation, and actual transmission of a packet in accordance with an exemplary embodiment. The structure of exemplary transmission initiation intervals is also illustrated in the Figure. In FIG. 3 example, it is illustrated that a subset of packet transmission initiation intervals corresponding to the broadcast intervals 204, 204', 204", is selected to be associated with the device. As discussed earlier in accordance with one aspect, the packet transmission initiation is restricted to the selected subset of transmission initiation intervals 210, 210' and 210".

In the example shown in FIG. 3 the selected transmission initiation intervals are the first transmission intervals of each broadcast interval, i.e., transmission initiation intervals 210, 210', and 210", however selection of a different subset of initiation intervals is possible provided that other constraints, e.g., spacing between the selected initiation intervals, are satisfied. In various embodiments the spacing in time between the selected transmission initiation intervals in a subset is equal to N transmission initiation intervals, where $N \geq (BC_{max})/(BD_{min})$. In various embodiments N is large enough to ensure that any back-off counter used by said communication device to determine a packet transmission time has expired by the start of a next selected transmission initiation interval. In some embodiments the duration of each packet transmission initiation interval includes a packet transmission time period and a null period in which no transmission occurs.

In some embodiments, the actual time of a packet transmission may, and sometimes does, vary depending on airlink utilization by one or more devices, i.e., when another device ends a packet transmission. However, the transmission initiation intervals IT1 210, . . . , ITL 220 recur over time without regard to when actual packet transmission occurs. Thus, the packet transmission initiation intervals appear as a recurring set of time intervals which recur in a predictable manner.

Since the selected packet transmission initiation intervals occur in a periodic manner, assuming that a device has data to be transmitted on a regular basis the corresponding packet transmissions are likely to occur over the airlink in a periodic or semi-periodic manner. In accordance with the features of various embodiments, the exemplary transmission initiation interval timing structure and the synchronous packet injection at the initiation interval boundaries, facilitate simultaneously transmission of packets from the devices and synchronous operation.

In some but not necessarily all embodiments, packet transmission length is intentionally limited to sizes which can be transmitted in a fraction of the amount of time the physical layer allows a single communications device to continuously transmit, e.g., in an amount of time which is equal to a fraction of the duration of a packet transmission initiation interval. This is achieved, at least in some embodiments, by an application sending data to the transmitter device, e.g., physical layer, constraining the amount of data sent at a given time to less than the maximum amount that the transmitter, e.g., an 802.11p transmitter, could transmit in a single packet. By constraining the amount of data to be transmitted at any one time, in at least some embodiments the packet transmission length is intentionally limited to sizes which can be transmitted in an amount of time which is less than the duration of a packet transmission initiation interval. The physical layer need not be aware of the data constraint which can be imposed by the application or MAC layer module supplying the data to the transmitter for transmission. The constraint on the size of the packet that is transmitted increases the probability that multiple devices will be able to successfully transmit packets, e.g., packets which are intentionally constrained to being small packets, at short intervals on a regular, e.g., periodic or semi-periodic basis, then would be the case if devices sent larger sized packets which might delay transmissions by other devices due to the amount of time to transmit them through the communications channel and the effect this may have on delaying the transmissions of other devices.

For the purposes of discussion of the example illustrated in FIG. 3, consider that a communications device, e.g., WT included in vehicle 102, has a packet for transmission and selects 210, 210', 210" to be associated with it. In accordance with the features of various embodiments, the initiation of packet transmission is restricted to the selected transmission initiation intervals. In FIG. 3 example, arrows 342, 346 and 350 indicate the time at which the data to be transmitted in a packet is generated by an application on the devices, e.g., becomes available for transmission. However it should be noted that this does not indicate the time at which the data packet is provided to the physical layer for processing and actual transmission. The arrows 344, 348 and 352 indicate that the time the packet is provided to a lower layer, e.g., MAC layer, for processing and transmission. Thus, as should be appreciated from the figure, the data is provided to the MAC queue for transmission at the very beginning of each of the selected packet transmission initiation intervals 210, 210' and 210".

It is possible that a packet may be generated by an application for transmission prior to the beginning of a selected transmission initiation interval, however in accordance with one aspect of various embodiments, the device is restricted to start the packet transmission initiation process in the selected transmission initiation intervals. Thus the generated packet is not provided to the physical layer until the beginning of the transmission initiation slot. In some embodiments, but not necessarily all embodiments, the device must provide data to be transmitted in a packet to the physical layer at the very beginning of the set of transmission initiation intervals selected for use by the device and not at any random time within the selected initiation intervals.

FIG. 3 is illustrated and discussed with the assistance of legend 310. Legend 310 identifies different patterns and/or abbreviations used to illustrate and/or represent various elements in FIG. 3. Legend 310 identifies that a box with diagonal lining pattern is used to represent actual transmission of a packet, such as packets 250, 251 transmitted by the communications device. In FIG. 3, $T_{CU}$ indicates the time period for which the carrier remains unoccupied. BC is an abbreviation used for back-off counter value.

In various embodiments, when a communications device has packet data for transmission, its back-off counter is zero, and channel sensing indicates that the channel has been idle for a DIFS or EIFS time period (depending on the result of the last packet transmission in the system), the device can transmit its packet.

The transmission initiation intervals with the exemplary structure including the nulls in which no transmission occurs, as used in accordance with various embodiments, ensures that the channel is unoccupied when packet transmission initiation (including channel sensing) is performed at the beginning of the selected transmission initiation intervals. In various embodiments the packet transmission initiation intervals are synchronized in time with regard to packet transmission initiation intervals used by devices within the transmission range of the communications device, e.g., within the transmission range of WT includes in Vehicle 102.

The communications device performs channel sensing operation to control back-off counter decrementing and/or to determine if the channel is unoccupied for purposes of avoiding a collision prior to transmission. In accordance with various embodiments, the device initiates the packet transmission process, e.g., by notifying the physical transmitter device that there is packet data to be transmitted, at the start of the selected subset of transmission initiation intervals 210, 210', 210". The device continues channel sensing when a packet becomes available for transmission at the beginning of the selected transmission initiation intervals. In some embodiments if the data to be transmitted becomes available during a transmission initiation interval, e.g., not at the start of the initiation interval boundary or earlier, the device does not initiate the packet transmission process in that initiation interval and thus the data is not supplied to the transmission system, e.g., physical layer, in that transmission initiation interval.

As illustrated in FIG. 3, the device starts the packet transmission initiation process at the beginning of the selected the transmission initiation intervals. Initiation of packet transmission triggers an attempt to transmit the packet by providing the data to be transmitted to the transmission system. As indicated by arrow 344 at the beginning of the device's selected transmission initiation interval 210 data to be transmitted is provided to the transmission system. The transmission initiation process includes a channel sensing operation. The channel sensing is performed after the back-off counter reaches zero if it was not zero at the time the data was provided to the transmission system as part of the packet transmission initiation process.

In FIG. 3 example, when the packet transmission initiation starts as indicated by arrow 344, the back-off counter would have decremented to zero (BC=0) because of the constraints, e.g., use of a null in each of the transmission initiation intervals and the spacing between the transmission initiation intervals selected by the device, imposed in accordance with various embodiments. The channel sensing indicates that the channel is unoccupied, e.g., airlink transmission resources are not being used or the signal energy detected on the transmission resources is below a threshold level. The device waits for a XIFS (EIFS/DIFS) time period and transmits the packet 250. In accordance with one aspect of various embodiments, following the transmission of the packet 250 in the transmission initiation interval 210, the device refrains from transmitting for a time period $T_{NULL}$ called as a null period. In some embodiments transmission of a packet occurs prior to the null period in the packet transmission initiation interval.

In some embodiments duration of each packet transmission initiation interval includes a packet transmission time period and a null period. In some embodiments the null period is an uninterrupted null period, i.e., a continuous time period for an entire duration where no transmission occurs. In some embodiments each packet transmission initiation interval allows for at most the transmission of one packet by the communications device, e.g., in some embodiments the device in constrained to transmitting one packet per selected transmission initiation interval. In some embodiments the packet transmission time period is limited to a time period which is less than a maximum transmission period permitted by a communications standard used to transmit the packet, e.g., such as 802.11p standard.

During initial packet transmission the device does not perform a back-off (and in some embodiments the back-off counter is initialized to zero for the initial packet transmission) and if the carrier is found to be unoccupied by carrier sensing, and the device waits for an EIFS/DIFS time period before starting packet transmission. Thus the minimum time period for which the channel needs to be unoccupied before transmission, denoted by $T_{CU}$, equals an unused DIFS or unused EIFS period.

After the successful transmission of packet the device continues channel sensing and selects a random back-off counter value. For example, consider that the communications device randomly selects a back-off counter value of BC=4. The device continues channel sensing and decrements the back-off counter value by one for each slot time the carrier remains unused. The back-off counter can not be decremented when the channel is occupied. As discussed earlier, presence of (i) at least one null period in each transmission initiation interval, and (ii) the separation between the selected transmission initiation intervals, in accordance with various embodiments ensures that the BC value is decremented from BC=4 to BC=0, by the time the device's next selected initiation interval, e.g., 210', arrives.

Thus, when the packet transmission initiation starts as indicated by arrow 348, the back-off counter would have decremented to zero. Accordingly, at the beginning of the transmission initiation interval 210', data to be transmitted is provided to the transmission system for processing and transmission as indicated by arrow 348. As part of the packet transmission initiation process, channel sensing is performed and the back-off counter value is checked at the time packet transmission initiation begins. The channel sensing indicates that the channel is unoccupied. The device waits for a XIFS (EIFS/DIFS) time period and transmits the packet 251. As shown in the figure following the transmission of the packet 251 in the transmission initiation interval 210', the device refrains from transmitting for a time period $T_{NULL}$. In some embodiments the null period is located at the beginning or end of the packet transmission initiation interval. In some embodiments at least a portion of the null period occurs adjacent a packet transmission initiation interval boundary (so that carrier sensing performed by devices, in a transmission initiation interval, will detect a null).

In some embodiments the null period occurs at the start of a packet transmission initiation interval and transmission of a packet starts following the null period. In some embodiments the null period $T_{NULL}$ is of a duration equal to a guard period plus one of an EIFS period or DIFS period. Thus in some embodiments $T_{NULL}=T_C+$a guard time.

After the transmission of packet 251, carrier sensing is continued and the device again selects a random back-off counter value. The back-off counter is decremented by one for each predetermined amount of time, e.g., slot time, for which the channel remains unused. The packet transmission operation continues in the manner discussed above.

Figure 4:
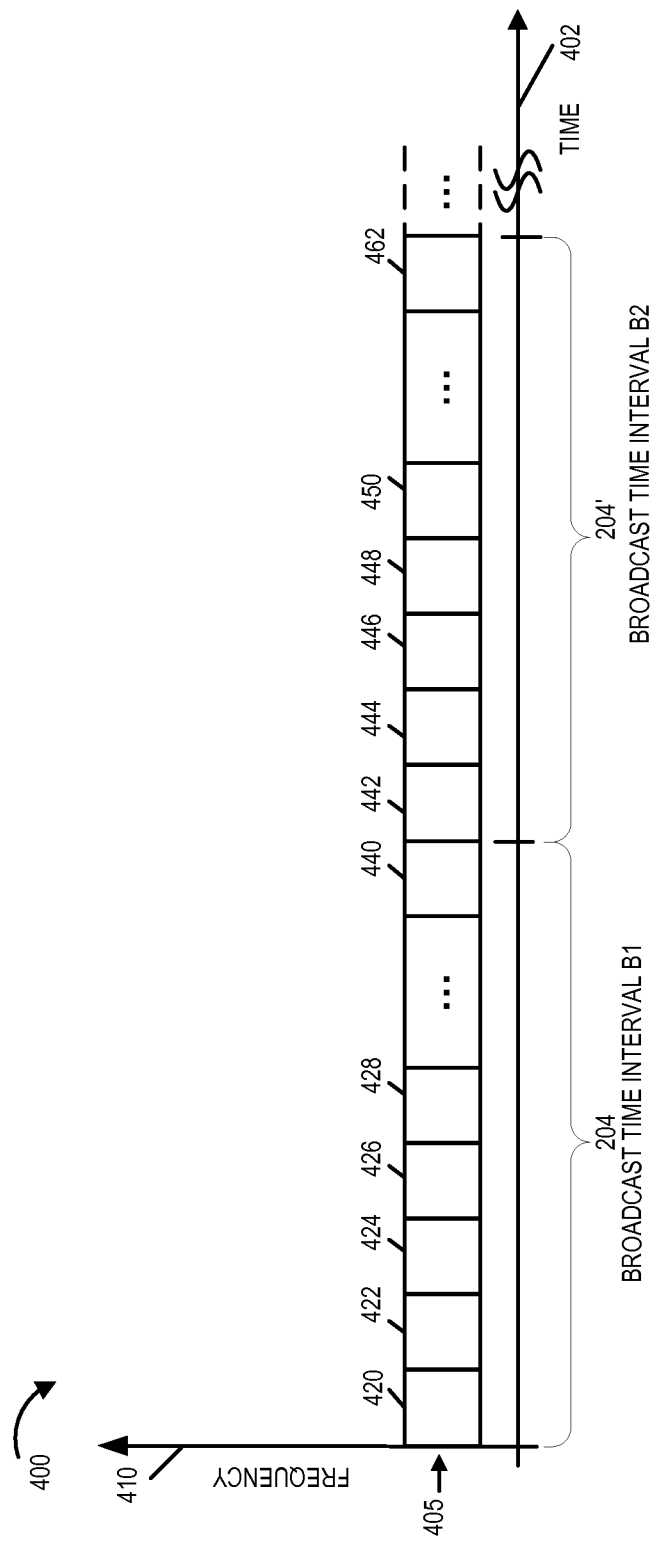
FIG. 4 illustrates an exemplary time-frequency structure of an exemplary communications channel, e.g., a broadcast channel, which can be used by communications devices in accordance with an exemplary embodiment.

FIG. 4 illustrates an exemplary time frequency structure 400 of an exemplary communications channel, e.g., broadcast channel, which can be used by communications devices in the exemplary wireless communications system 100 of FIG. 1, to communicate information, e.g., packets. In FIG. 4, the horizontal axis 402 represents time and the vertical axis 410 represents frequency. The horizontal time axis 402 is the same as or similar to the time axis 202 of FIGS. 2-3 and shows the timing structure of a broadcast channel 405, e.g., recurring broadcast intervals 204, 204', and thus same reference numbers are used to identify the recurring broadcast intervals as used in FIGS. 2-3. The exemplary time frequency structure 400 includes the broadcast channel 405 which is used, in some embodiments, for control signaling communications.

In accordance with various embodiments the broadcast channel 405 is partitioned into a plurality of transmission resources, e.g., OFDM air link resources, which are used for communicating, e.g., transmitting and/or receiving, information. Each recurring broadcast interval includes, e.g., M transmission resources. As illustrated, transmission resources 420 through 440 correspond to the first broadcast time interval 204 while transmission resources 442 through 462 correspond to the second broadcast time interval 204'. In FIG. 4 example, each individual transmission resource is an OFDM tone symbol.

In various embodiments the air link transmission resources shown in FIG. 4 are used for the transmitting and/or receiving packets, e.g., such as the packets 250, 251. In accordance with one aspect, the broadcast channel 405 is available for use by various communications devices. In accordance with one feature of some embodiments when the communications devices wish to transmit, the devices sense the channel 405 to determine if the channel 405 is occupied or idle, e.g., unoccupied. When the channel 405 is unoccupied, the devices follow the above discussed channel access process to access the channel, e.g., for transmitting a packet. During channel sensing operation, the communications devices monitor to detect energy on the airlink transmission resources during the broadcast intervals. Based on the energy detected on the transmission resources during the monitored broadcast time intervals, amount of airlink resource utilization during the monitoring period is determined and thus a determination whether the channel is busy or idle can be made. In some embodiments the device identifies transmission initiation intervals during which a maximum amount of energy detected on the transmission resources is below a threshold, and selects a subset of transmission initiation intervals from the identified transmission initiation intervals. In some embodiments the device selects a subset of transmission initiation intervals during which lowest amount of signal energy is detected on the transmission resources during the monitoring operation.

Figure 5:
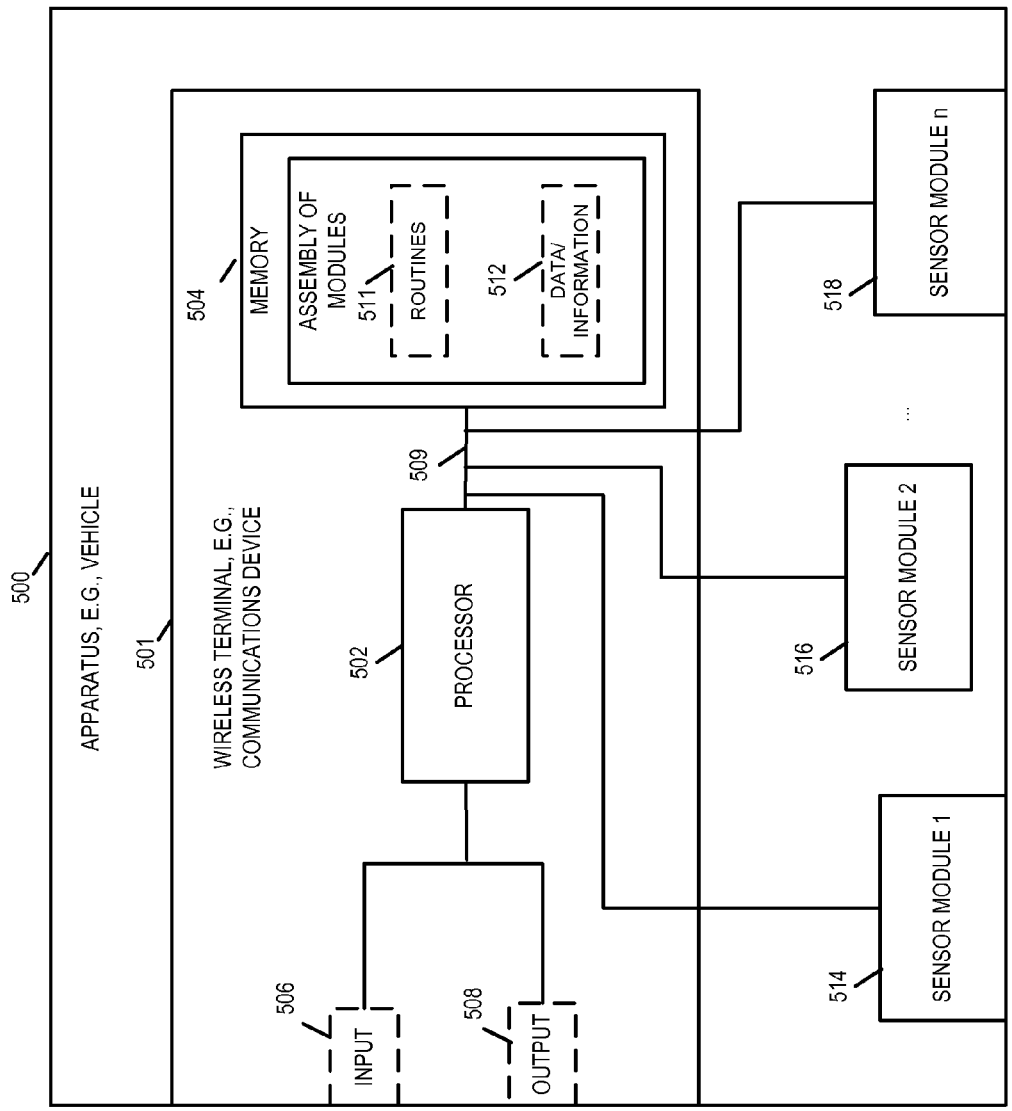
FIG. 5 is a drawing of an exemplary apparatus including a communications device, e.g., a vehicle supporting wireless communications, in accordance with various embodiments.

FIG. 5 is a drawing of an exemplary apparatus 500, e.g., a vehicle. Exemplary apparatus 500 is, e.g., any of the vehicles (102, 104, 106, 108, 110, . . . , 112) of the system 100 of FIG. 1. Exemplary apparatus 500 includes a wireless terminal 501, e.g., a wireless communications device, and a plurality of sensor modules (sensor module 1 514, sensor module 2 516, . . . , sensor module n 518) coupled together. In some embodiments, one or more of the sensor modules (514, 516, . . . , 518) are included as part of the wireless terminal 501. In some embodiments, the wireless terminal and/or sensor modules are aftermarket components which are installed in a vehicle. In some embodiments, the wireless terminal and/or sensor modules are integral part of a vehicle, e.g., included as part of factory build. In some such embodiments, the wireless terminal and sensor modules are included as standard built in equipment in the vehicle.

Wireless terminal 501 is, e.g., a mobile wireless communications device which supports a peer to peer signaling protocol. In some embodiments, the peer to peer signaling protocol is an 802.11 based protocol or similar protocol. Wireless terminal 501 can be used as any one of the wireless terminal included in the vehicles (102, 104, 106, 108, 110, ..., 112) shown in system 100.

Wireless terminal 501 includes a processor 502 and memory 504 coupled together via a bus 509 over which the various elements (505, 504) may interchange data and information. Wireless terminal 501 further includes an input module 506 and an output module 508 which may be coupled to processor 502 as shown. However, in some embodiments, the input module 506 and output module 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output. In some embodiments, memory 504 includes routines 511 and data/information 513.

In various embodiments the processor 502 is configured to store, e.g., in memory 504, information defining a plurality of packet transmission initiation intervals, each transmission initiation interval being of a predetermined duration which is longer than an amount of time required to transmit a packet, the transmission initiation intervals corresponding to a recurring broadcast interval including multiple packet transmission initiation opportunities. As an example, FIGS. 2-3 illustrate exemplary recurring broadcast interval and transmission initiation intervals. In some embodiments each broadcast interval includes multiple packet transmission initiation opportunities, e.g., L transmission initiation intervals, L being a positive integer.

In some embodiments, processor 502 is configured to perform monitoring, on an ongoing basis during a broadcast time interval, for use of transmission resources during at least a portion of the recurring broadcast interval. The processor 502 performs monitoring to determine the amount of airlink resource utilization during the monitoring period, e.g., to detect if the broadcast channel resources are being used by another device or are unoccupied. In various embodiments, processor 502 is further configured to measures signal energy on the transmission resources to determine the utilization of the transmission resources, as part of performing the monitoring.

In various embodiments, processor 502 is further configured to monitor to receive packet(s), e.g., packet communicating information, and to receive one or more packets, e.g., from another communications device. In some embodiments processor 502 is further configured to receive one or more packets without synchronization to transmission initiation boundaries occurring within the recurring broadcast interval. For example, a packet is received without synchronization to transmission initiation interval boundary, e.g., across the boundary of transmission initiation interval IT1 210. In some embodiments processor 502 is further configured to receive a packet which is transmitted during a time period which spans a boundary between packet transmission broadcast intervals.

In various embodiments, processor 502 is further configured to identify transmission initiation intervals having an average or maximum amount of signal energy detected on the transmission resources, during said monitoring, below a first threshold. The processor 502 controls the communications device to monitor transmission resources and identifies one or more transmission initiation intervals, e.g., IT1 210, IT2 212, ... etc., where an average or maximum signal energy detected on the transmission resources is below a first threshold, e.g., a predetermined threshold.

In various embodiments, processor 502 is further configured to select one or more transmission resources and transmission initiation intervals corresponding to the recurring broadcast interval to be associated with the communications device. In some embodiments, processor 502 is configured to select a subset, e.g., one or more, of transmission initiation intervals, e.g., pseudo randomly, from the identified transmission initiation intervals which are separated from one another in time by at least N transmission initiation intervals. In some embodiments N is large enough to ensure that any back-off counter value used by the communications device to determine a packet transmission time has expired by the start of the next selected transmission initiation interval. In some embodiments, N is an integer value≥(greater than or equal to) the maximum back-off counter value divided by the minimum back-off decrement which will occur in each transmission initiation interval, i.e., N≥($BC_{max}$)/(Minimum back-off decrement time period).

In some embodiments the processor 502 is configured to select a subset of tones, e.g., OFDM tone symbols, to be used for packet transmission as a function of measured signal energy on said transmission resources. In some embodiments transmission resources on which lowest signal energy is detected are selected for packet transmission. In various embodiments, processor 502 is further configured to select a subset of packet transmission initialization intervals corresponding to the time intervals in which the least signal energy was detected on the transmission resources during the monitoring operation and which are which are separated from one another in time by at least N transmission initiation intervals. Thus in some embodiments the initiation intervals corresponding to the tones on which lowest signal energy is detected, are selected to be associated with the device.

In some embodiments selecting a subset of transmission initiation intervals includes selecting at least one of L transmission initiation intervals IT1 210, ..., ITL 220, where L is an integer greater than 2, the selected subset including less than L selected transmission initiation intervals. In various embodiments the packet transmission time period is limited to a time period which is less than a maximum transmission period permitted by a communications standard, e.g., 802.11p standard, used to transmit the packets. In some embodiments the processor 502 is further configured to restrict the packet length of a packet to be transmitted, to be less than or equal to a fraction, e.g., one third, of the duration of a packet transmission initiation interval.

In various embodiments, each packet transmission initiation interval includes a packet transmission interval and a null period in which no transmission occurs. In various embodiments the null period is an uninterrupted null period. In some embodiments the device is constrained to transmitting one packet per initiation interval. In various embodiments the null period is located at the beginning or end of the packet transmission initiation interval. In some embodiments at least a portion of said null period occurs adjacent a packet transmission initiation interval boundary.

In various embodiments transmission of a packet occurs at the start of a packet transmission initiation interval with the null period following transmission of the packet. In some embodiments the null period occurs at the start of a packet transmission initiation interval and wherein transmission of a packet starts following said null period.

In various embodiments, processor 502 is further configured to generate data to be transmitted in a packet. The data may be, e.g., location information report, location update report, etc. In various embodiments, processor 502 is further configured to restrict initiation of packet transmission to transmission initiation intervals associated with the communications device 501, the transmission initiation intervals associated with the communications device 501 being separated from one another in time by at least N transmission initiation intervals. Thus in some embodiments the processor 502 is configured to limit the initiation of packet transmission to the selected subset of transmission initiation intervals, e.g., selected transmission initiation intervals, e.g., 210, 210', 210".

Processor 502, in various embodiments, is further configured to perform a back-off operation. Processor 502 is further configured to select, as part of performing the back-off operation, a back-off counter value and starts decrementing the back-off counter value by one each time a predetermined amount of time passes without a signal from another device being sensed for a period of time. In various embodiments, processor 502 is further configured to randomly select the back-off counter. In accordance with one aspect of various embodiments, the selected subset of transmission initiation intervals are separated from one another in time by at least N transmission initiation intervals. In various embodiments N is large enough to ensure that any back-off counter value, used by the communications device to determine a packet transmission time, expires by the start of the next selected transmission initiation interval. Thus by the time the next selected transmission initiation interval arrives, the back-of counter value expires and since the devices are operating in the system 100 in a synchronized manner, when the device performs carrier sensing at the start of the next selected transmission initiation interval it detects unoccupied channel.

In various embodiments, processor 502 is further configured to initiate, on a periodic basis, transmission of a packet communicating information. In some embodiments, initiation of packet transmission includes providing the generated data to be transmitted to the physical layer for transmission. In various embodiments the initiation of packet transmission includes performing channel sensing, e.g., to determine if the carrier occupied or unoccupied. As part of the initiation of packet transmission, the processor 502 is further configured to perform channel sensing. In accordance with one feature of various embodiments when the channel is detected unoccupied, the device waits for a predetermined EIFS/DIFS time period and transmits the packet.

In various embodiments, processor 502 is further configured to perform a packet transmission operation in the selected transmission initiation interval, e.g., at a time following an EIFS/DIFS period. Processor 502 is further configured, as part of being configured to performing the packet transmission operation, to transmit the packet in response to the initiation of transmission of the packet.

In various embodiments the transmission initiation intervals are synchronized in time with regard to packet transmission initiation intervals used by devices within the transmission range of the communications device 501. In various embodiments the packet transmission time period is limited to a time period which is less than a maximum transmission period permitted by a communications standard used to transmit the packet.

In various embodiments the processor 502 is further configured to stop the processing associated with an individual transmitted packet, and continue controlling the communications device 501 to perform other operations on an ongoing basis, e.g., to generate data for transmission in other packets, transmit and/or receive packets.

Figure 6A:
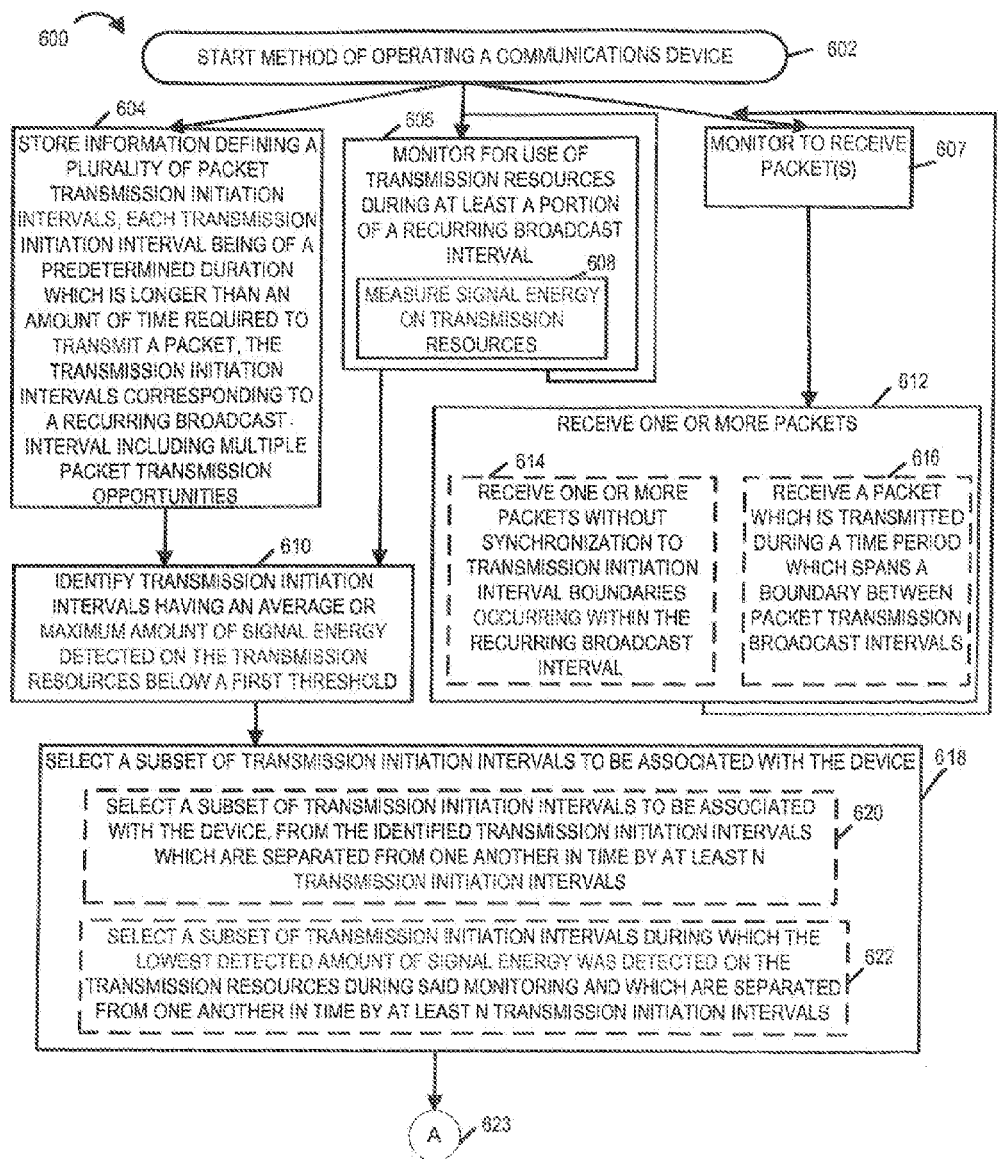
FIG. 6, which comprises a combination of FIGS. 6A and 6B, is a flowchart illustrating an exemplary method of operating a communications device in accordance with an exemplary embodiment.
Figure 6B:
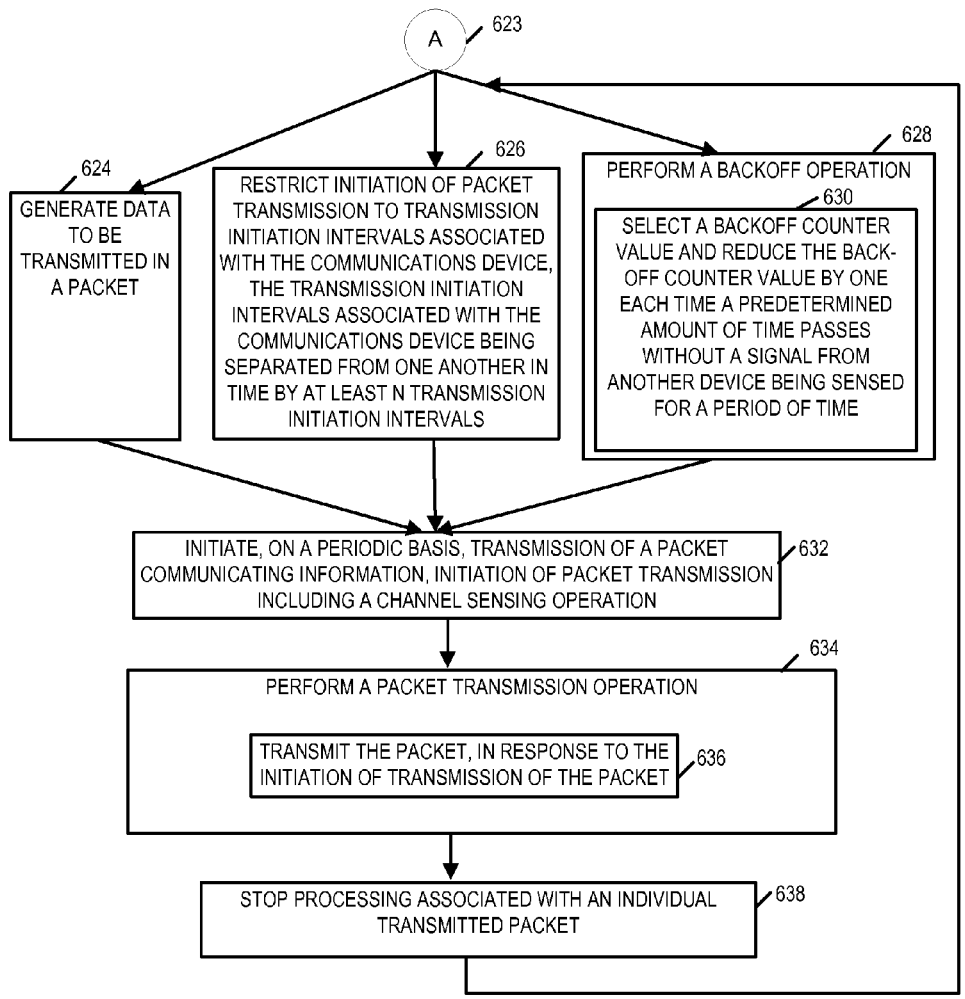

FIG. 6, which comprises a combination of FIGS. 6A and 6B, is a flowchart 600 illustrating an exemplary method of operating a wireless communications device in accordance with an exemplary embodiment. The method of flowchart 600 of FIG. 6 may be implemented by a communications device such as a wireless terminal, e.g., wireless terminal 501 of apparatus 500 of FIG. 5.

The exemplary method of flowchart 600 starts in step 602, where the wireless terminal is powered on and initialized. Operation proceeds from start step 602 to steps 604, 606. In some embodiments operation also proceeds to step 607 which is performed asynchronously in parallel.

In step 604 the communications device stores information defining a plurality of packet transmission initiation intervals, each transmission initiation interval being of a predetermined duration which is longer than an amount of time required to transmit a packet, said transmission initiation intervals corresponding to a recurring broadcast interval including multiple packet transmission initiation opportunities. As an example, FIGS. 2-3 illustrate exemplary recurring broadcast interval and transmission initiation intervals. In some embodiments the recurring broadcast interval is a recurring time period in a timing structure, e.g., time interval 204 in timing structure 200, used to control wireless transmissions. Thus in step 604 the communications device stores information defining the transmission initiation interval timing structure 235 imposed on top of the broadcast interval timing structure 200. As discussed in detail with regard to FIGS. 2-3, each broadcast interval includes multiple packet transmission initiation opportunities, e.g., L transmission initiation intervals, L being a positive integer. Operation proceeds from step 604 to step 610.

In step 606 which may, and in some embodiments is, performed on an ongoing basis during a broadcast time interval, the communications device monitors for use of transmission resources, e.g., transmission resources 420, 422, . . . , during at least a portion of said recurring broadcast interval. The device performs monitoring to determine the amount of airlink resource utilization during the monitoring period, e.g., to detect if the broadcast channel resources are being used by another device or are unoccupied. In various embodiments, step 608 is performed as part of step 606, where the communications device measures signal energy on the transmission resources to determine the utilization of the transmission resources. Operation proceeds from step 604 to step 610.

Step 607 is performed asynchronously. In step 607 the communications device monitors to receive packet(s), e.g., packet communicating information from another device. Operation proceeds from step 607 to step 612. In step 607 the device receives one or more packets, e.g., from another communications device. In some embodiments, step 612 includes at least one of step 614 or step 616. In step 614 the communications device receives one or more packets without synchronization to transmission initiation boundaries occurring within the recurring broadcast interval. For example, a packet is received without synchronization to transmission initiation interval boundary, e.g., across the boundary of transmission initiation interval IT1 210. In some embodiments step 616 is performed wherein the device receives a packet which is transmitted during a time period which spans a boundary between packet transmission broadcast intervals.

In step 610 the communications device identifies transmission initiation intervals having an average or maximum amount of signal energy detected on the transmission resources, during said monitoring, below a first threshold.

Thus the communications device monitors transmission resources and identifies one or more transmission initiation intervals, e.g., IT1 210, IT2 212, . . . , ITL 220, where an average or maximum signal energy detected on the transmission resources is below a first threshold, e.g., a predetermined threshold. Operation proceeds from step 610 to step 618.

In step 618 the communications device selects one or more transmission resources and transmission initiation intervals corresponding to the recurring broadcast interval to be associated with the communications device. In various embodiments at least one of steps 620 or 622 is performed as part of selection step 618. In step 620 the communications device selects a subset, e.g., one or more, of transmission initiation intervals, e.g., pseudo randomly, from the identified transmission initiation intervals which are separated from one another in time by at least N transmission initiation intervals. In various embodiments N is large enough to ensure that any back-off counter value used by the communications device to determine a packet transmission time has expired by the start of the next selected transmission initiation interval. In some embodiments, N is an integer value≥(greater than or equal to) the maximum back-off counter value divided by the minimum back-off decrement which will occur in each transmission initiation interval, i.e., N≥($BC_{max}$)/(Minimum back-off decrement time period).

In some embodiments the communications device selects a subset of tones, e.g., OFDM tone symbols, to be used for packet transmission as a function of measured signal energy on said transmission resources. In some embodiments transmission resources on which lowest signal energy is detected are selected for packet transmission. In step 622 where the device selects a subset of packet transmission initialization intervals corresponding to the time intervals in which the least signal energy was detected on the transmission resources during the monitoring operation and which are separated from one another in time by at least N transmission initiation intervals. Thus in some embodiments the device selects the initiation intervals corresponding to the tones on which lowest signal energy is detected, e.g., as measured in step 608.

In some embodiments selecting a subset of transmission initiation intervals includes selecting at least one of L transmission initiation intervals IT1 210, . . . , ITL 220, where L is an integer greater than 2, the selected subset including less than L selected transmission initiation intervals. In various embodiments the packet length is limited, in terms of time span for packet transmission, to a fraction of the transmission initiation time interval. For example, in some embodiments the packet length is restricted to be less than or equal to one third of the duration of a packet transmission initiation interval.

In various embodiments, each packet transmission initiation interval includes a packet transmission interval and a null period in which no transmission occurs. In various embodiments the null period is an uninterrupted null period. In some embodiments each packet transmission initiation interval allows for at most the transmission of one packet by said communications device. Thus in some embodiments the device is constrained to transmitting one packet per initiation interval. In various embodiments the null period is located at the beginning or end of the packet transmission initiation interval. In some embodiments at least a portion of said null period occurs adjacent a packet transmission initiation interval boundary. Thus in some embodiments, carrier sensing performed by various devices working in accordance with the exemplary method will detect a null, e.g., no transmissions, at the start of a packet transmission initiation interval.

In various embodiments transmission of a packet occurs at the start of a packet transmission initiation interval with the null period following transmission of the packet. In some embodiments the null period occurs at the start of a packet transmission initiation interval and wherein transmission of a packet starts following said null period.

Operation proceeds from step 618 to steps 624, 626 and 628 via the connecting node A 623. Steps 624, 626 and 628 are performed asynchronously. In step 624, data to be transmitted in a packet is generated. For example, an application on the device may generate the data, e.g., location information report, to be transmitted. In some embodiments the same application packetizes the data to generate a packet to be transmitted. In some embodiments a different application or a lower level layer may packetize the data to generate a packet including the data to be transmitted. Operation proceeds from step 624 to step 632.

In step 626 the communications device restricts initiation of packet transmission to transmission initiation intervals associated with the communications device, the transmission initiation intervals associated with the communications device being separated from one another in time by at least N transmission initiation intervals. Thus in some embodiments the communications device limits the initiation of packet transmission to the selected subset of transmission initiation intervals, e.g., selected transmission initiation intervals 210, 210', 210". It should be appreciated that by selecting a subset of the packet initiation intervals, and limiting the initiation of packet transmission to the selected subset of initiation intervals in the recurring timing structure, potential for collisions is reduced as compared to systems where all devices are allowed to contend for resources during all time periods. Operation proceeds from step 626 to step 632.

In step 628 the device performs a back-off operation. In various embodiments step 628 includes step 630 wherein the device selects, as part of performing the back-off operation, a back-off counter value and starts decrementing the back-off counter value by one each time a predetermined amount of time passes without a signal from another device being sensed for a period of time. In various embodiments, the device randomly selects the back-off counter. Thus it should be appreciated that the device performs the back-off operation, e.g., when carrier sensing detects that the carrier is unoccupied. The packet transmission normally occurs when the back-off counter decrements to zero and the carrier sensing detects that the channel is unoccupied. In accordance with one aspect of various embodiments, the selected subset of transmission initiation intervals are separated from one another in time by at least N transmission initiation intervals. In various embodiments N is large enough to ensure that any back-off counter value, used by the communications device to determine a packet transmission time, expires by the start of the next selected transmission initiation interval. Thus by the time the next selected transmission initiation interval arrives, the back-off counter value expires and since the devices are operating in the system 100 in a synchronized manner, when the device performs carrier sensing at the start of the next selected transmission initiation interval it detects unoccupied channel. Operation proceeds from step 628 to step 632.

In step 632 the device initiates, on a periodic basis, transmission of a packet communicating information. In various embodiments, initiation of packet transmission includes providing the generated data to be transmitted to the physical layer for transmission. In various embodiments the initiation of packet transmission includes performing channel sensing, e.g., to determine if the carrier occupied or unoccupied. As discussed in detail earlier, as part of the initiation of packet transmission, the communications device performs channel sensing and when unoccupied channel is detected, waits for a predetermined EIFS/DIFS time period and transmits the packet.

Following the initiation of packet transmission, in step 634 the device performs a packet transmission operation in the selected transmission initiation interval, e.g., at a time following an EIFS/DIFS period. Performing the packet transmission operation in step 634 includes performing step 636 where the device transmits the packet in response to the initiation of transmission of the packet.

In accordance with one feature of various embodiments, the time of packet transmission may be different than the time at which packet transmission initiation was started. For example, the packet transmission initiation may, and in some embodiments does, occur at the beginning of the selected transmission initiation interval, however the device waits for an EIFS/DIFS period after sensing that the channel is unoccupied, prior to the actual transmission of the packet. However it should be appreciated that the packet transmission occurs within the selected transmission initiation interval. In various embodiments the transmission initiation intervals are synchronized in time with regard to packet transmission initiation intervals used by devices within the transmission range of the communications device implementing the method of flowchart 600. In various embodiments the packet transmission time period is limited to a time period which is less than a maximum transmission period permitted by a communications standard used to transmit the packet. In some embodiments the communications standard used to transmit the packet is an 802.11p version 2010 communications standard.

Operation proceeds from step 634 to step 638 where the device stops the processing associated with an individual transmitted packet. However the operation of the device continues, e.g., with packets being generated, transmitted and/or received, on an ongoing basis.

FIG. 7 illustrates an assembly of modules 700 which may be used as the assembly of modules in the exemplary apparatus of FIG. 5, e.g., in the communications device 501. The modules in the assembly 700 can be implemented in hardware within the processor 502 of FIG. 5, e.g., as individual circuits. Alternatively, the modules may be implemented in software and stored in the memory 504 shown in FIG. 5. In some such embodiments, the assembly of modules 700 is included in routines 511 of memory 504 of device 501 of FIG. 5. While shown in the FIG. 5 embodiment as a single processor, e.g., computer, it should be appreciated that the processor 502 may be implemented as one or more processors, e.g., computers. When implemented in software the modules include code, which when executed by the processor, configure the processor, e.g., computer, 502 to implement the function corresponding to the module. In some embodiments, processor 502 is configured to implement each of the modules of the assembly of modules 700. In embodiments where the assembly of modules 700 is stored in the memory 504, the memory 504 is a computer program product comprising a computer readable medium, e.g., a non-transitory computer readable medium, comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the wireless communications device 501 or elements therein such as the processor 502, to perform the functions of the corresponding steps illustrated and/or described in the method of flowchart 600 of FIG. 6.

Figure 7A:
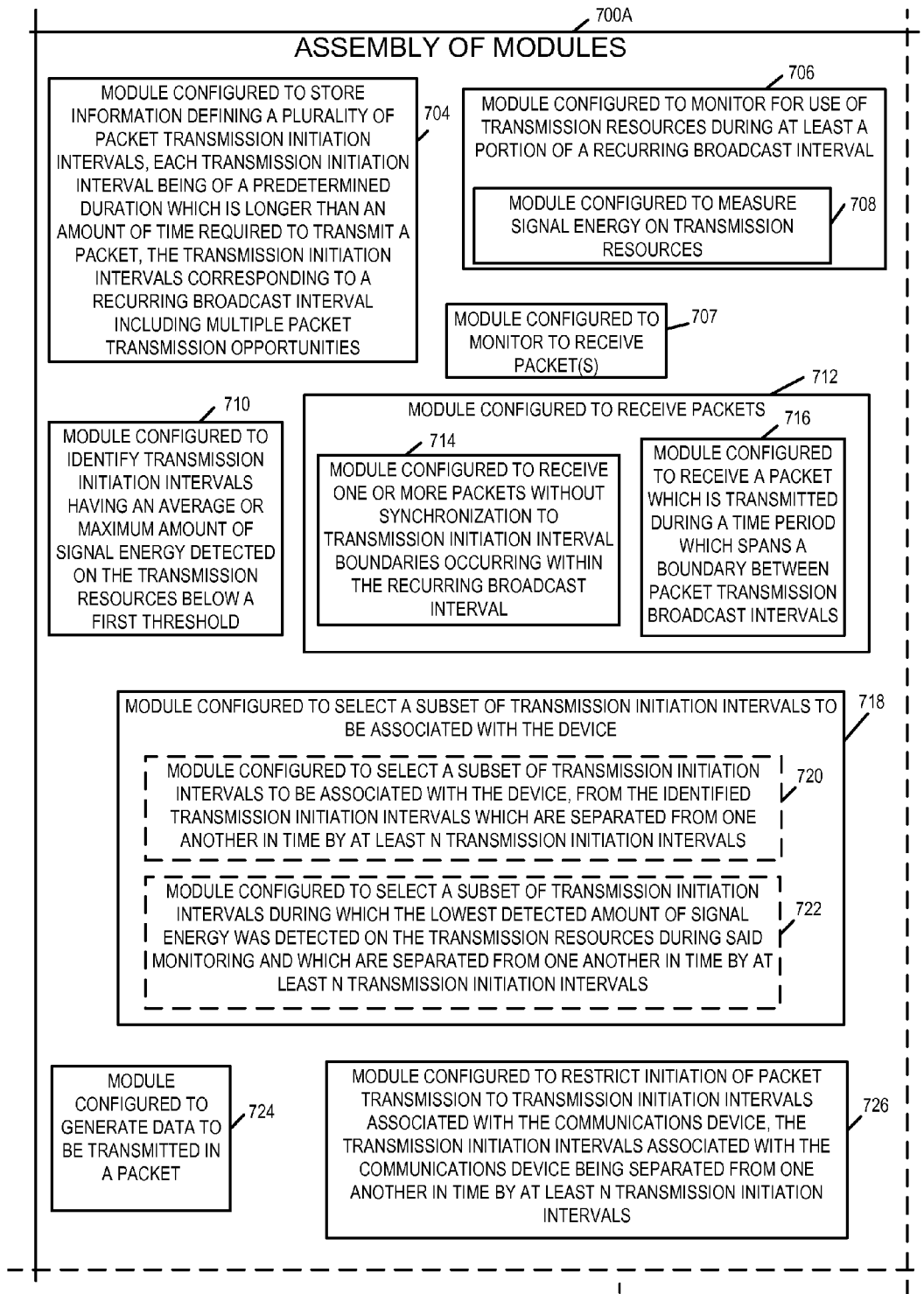
FIG. 7 illustrates an assembly of modules which may be used as the assembly of modules in the exemplary apparatus of FIG. 5.
Figure 7B:
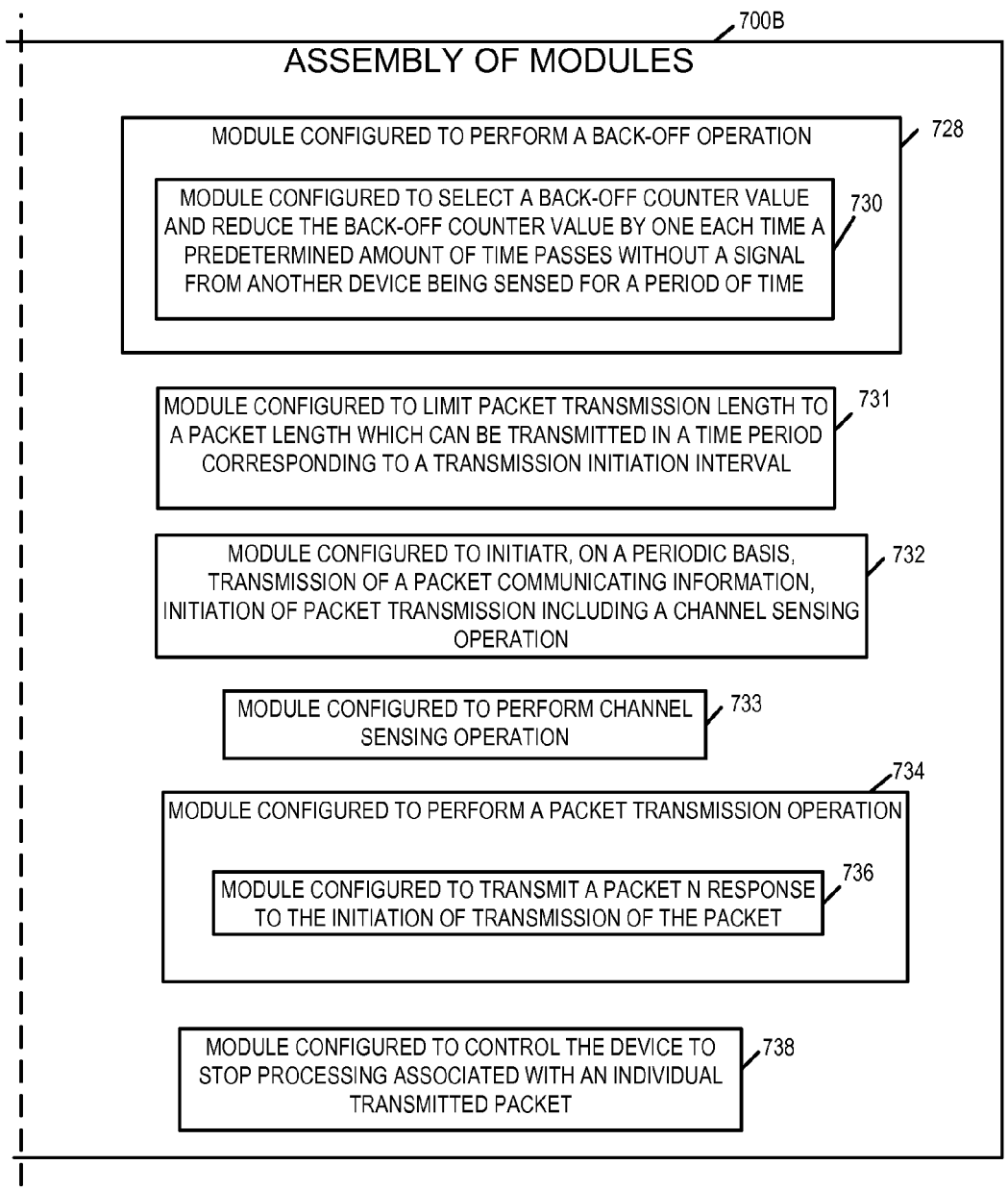

As illustrated in FIG. 7, the assembly of modules 700, comprising first part 700A illustrated by FIG. 7A and second part 700B illustrated by FIG. 7B, includes: a module 704 configured to store information defining a plurality of transmission initiation intervals, each transmission initiation interval being of a predetermined duration which is longer than an amount of time required to transmit a packet, the transmission initiation intervals corresponding to a recurring broadcast interval including multiple packet transmission initiation opportunities, a module 706 configured to perform monitoring, on an ongoing basis during a broadcast time interval, for use of transmission resources, e.g., transmission resources 420, 422, . . . , during at least a portion of said recurring broadcast interval, and a module 707 for monitoring to receive packet(s), e.g., packet communicating information from another device. In various embodiments, module 706 includes a module 708 configured to measure signal energy on the transmission resources to determine the utilization of the transmission resources. In some embodiments the communications device including the assembly of modules 700 uses module 706 to perform monitoring to determine the amount of air link resource utilization during the monitoring period, e.g., to detect if the broadcast channel resources are being used by another device or are unoccupied.

In various embodiments, the assembly of modules 700 further includes a module 707 configured to monitor to receive one or more packets, e.g., from another communications device, a module 710 configured to identify transmission initiation intervals having an average or maximum amount of signal energy detected on the transmission resources, during the operation monitoring, below a first threshold, and a module 712 configured to receive packets.

Module 710 in some embodiments receives input from module 706 and uses the input to identify the one or more transmission initiation intervals. In some embodiments, module 712 configured to receive packets includes a module 714 configured to receive one or more packets without synchronization to transmission initiation boundaries occurring within the recurring broadcast interval. For example, module 704 may receive a packet without synchronization to transmission initiation interval boundary, e.g., across the boundary of transmission initiation interval IT1 210. In some embodiments module 712 includes a module 716 configured to receive a packet which is transmitted during a time period which spans a boundary between packet transmission broadcast intervals. In some embodiments each broadcast interval includes multiple packet transmission initiation opportunities, e.g., L transmission initiation intervals, L being a positive integer.

In various embodiments the assembly of modules 700 further includes a module 718 configured to select one or more transmission resources and transmission initiation intervals corresponding to the recurring broadcast interval to be associated with the communications device. In various embodiments, module 718 may receive input from the 706 and/or 710 and use the input to perform the selection. In some embodiments module 718 includes at least one of modules 720 or 722. Module 720 is configured to select a subset, e.g., one or more, of transmission initiation intervals, e.g., pseudo randomly, from the identified transmission initiation intervals which are separated from one another in time by at least N transmission initiation intervals. In various embodiments N is large enough to ensure that any back-off counter value used by the communications device to determine a packet transmission time has expired by the start of the next selected transmission initiation interval. In some embodiments, N is an integer value≥(greater than or equal to) the maximum back-off counter value divided by the minimum back-off decrement which will occur in each transmission initiation interval, i.e., $N \geq (BC_{max})/(\text{Minimum back-off decrement time period})$.

In some embodiments the communications device selects a subset of tones, e.g., OFDM tone symbols, to be used for packet transmission as a function of measured signal energy on said transmission resources. In some embodiments transmission resources on which lowest signal energy is detected are selected for packet transmission. Module 722 is configured to select a subset of packet transmission initialization intervals corresponding to the time intervals in which the least signal energy was detected on the transmission resources during the monitoring operation and which are which are separated from one another in time by at least N transmission initiation intervals. In some embodiments module 718 configured to select a subset of transmission initiation intervals selects at least one of L transmission initiation intervals IT1 210, ..., ITL 222, where L is an integer greater than 2, the selected subset including less than L selected transmission initiation intervals.

In various embodiments the assembly of modules 700 includes a module configured to limit a packet transmission time period to a time period which is less than a maximum transmission time period permitted by a communications standard used to transmit the packet.

In some embodiments the assembly of modules 700 further includes a module 724 configured to generate data to be transmitted in a packet, a module 726 configured to restrict initiation of packet transmission to transmission initiation intervals associated with the communications device, the transmission initiation intervals associated with the communications device being separated from one another in time by at least N transmission initiation intervals, and a module 728 configured to perform a back-off operation. In various embodiments module 728 includes a module 730 configured to select, as part of being configured to perform the back-off operation, a back-off counter value and decrementing the back-off counter value by one each time a predetermined amount of time passes without a signal from another device being sensed for a period of time. In some embodiments module 730 is configured to randomly select the back-off counter as part of performing the back-off operation.

In various embodiments the device performs the back-off operation, e.g., when carrier sensing detects that the carrier is unoccupied. The packet transmission normally occurs when the back-off counter decrements to zero and the carrier sensing detects that the channel is unoccupied. In accordance with one aspect of various embodiments, the selected subset of transmission initiation intervals are separated from one another in time by at least N transmission initiation intervals. In various embodiments N is large enough to ensure that any back-off counter value, used by the communications device to determine a packet transmission time, expires by the start of the next selected transmission initiation interval.

In some embodiments the assembly of modules 700 further includes a module 731 configured to limit a packet transmission length to a packet length which can be transmitted in a time period corresponding to a transmission initiation interval. In some embodiments the 731 limits the packet length, in terms of time span for packet transmission, to a fraction of a transmission initiation time interval.

In various embodiments the assembly of modules 700 further includes a module 732 configured to initiate, on a periodic basis, transmission of a packet communicating information, initiation of packet transmission including a channel sensing operation, a module 733 configured to perform channel sensing operation, a module 734 configured to perform a packet transmission operation, and a module 738 configured to control the communications device to stop processing associated with an individual transmitted packet. In various embodiments, the module 732 injects the data to be transmitted in a packet into the MAC at the very beginning of the selected initiation interval thereby initiating packet transmission and the process relating to transmission resource contention to transmit the packet. Thus the module 732 provides the generated data to be transmitted in a packet to the module 734 for transmission purposes. In various embodiments the initiation of packet transmission includes performing channel sensing, e.g., to determine if the carrier occupied or unoccupied.

In some embodiments the device uses the 802.11p based channel access mechanism for transmission resource contention purposes and obtains access to the channel. Due to the design of the transmission initiation interval structure, nodes will have depleted their 802.11p back-off counters and completed EIFS/DIFS sensing when the packet is injected into the MAC queue thereby allowing for transmission without having to wait for further decrementing of the back off counters and/or further EIFS/DIFS sensing.

Module 734 performs a packet transmission operation in the selected transmission initiation interval, e.g., at a time following an EIFS/DIFS period. Module 734 includes a module 736 configured to transmit the packet in response to the initiation of transmission of the packet.

In accordance with one feature of various embodiments, the time the packet is actually transmitted by module 736 may be different than the time at which packet transmission initiation was started. For example, the packet transmission initiation may, and in many embodiments does, occur at the beginning of the selected transmission initiation interval, however the device waits for an EIFS/DIFS period after sensing that the channel is unoccupied, prior to the actual transmission of the packet. In some embodiments, module 738 stops the processing associated with an individual transmitted packet, however the operation of the device continues, e.g., with packets being generated, transmitted and/or received, on an ongoing basis.

Various methods and apparatus described in this application are well suited for use in wireless communications devices and networks supporting peer to peer signaling. In various embodiments a device of any of one or more of Figures includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device to transmit packets, the method comprising:
    storing information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities;
    selecting a subset of transmission initiation intervals to be associated with said communications device; and
    restricting initiation of packet transmission to transmission initiation intervals associated with said communications device, said transmission initiation intervals associated with said communications device being separated from one another in time by at least N transmission initiation intervals, N being a non-zero integer value.

2. The method of claim 1, wherein the duration of each packet transmission initiation interval includes a packet transmission time period and a null period in which no transmission occurs.

3. The method of claim 2, wherein transmission of a packet occurs prior to said null period in a packet transmission initiation interval.

4. The method of claim 3, further comprising:
reducing a value of a transmission back-off counter by one each time a predetermined amount of time passes without a signal from another device being sensed, following one of an unused DIFS (Distributed coordination function Inter Frame Spacing) or unused EIFS (Extended Inter Frame Spacing) period.

5. The method of claim 2, wherein said null period is of a duration equal to a guard period plus one of a EIFS (Extended Inter Frame Spacing) period or a DIFS (Distributed coordination function Inter Frame Spacing) period.

6. The method of claim 2, wherein said packet transmission period is limited to a time period which is less than a maximum transmission period permitted by a communications standard used to transmit said packet.

7. The method of claim 1, wherein said packet transmission initiation intervals are synchronized in time with regard to packet transmission initiation intervals used by devices within a transmission range of said communications device.

8. The method of claim 6, wherein said communications standard is an 802.11p transmission standard.

9. A communications device comprising:
means for storing information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities;
means for selecting a subset of transmission initiation intervals to be associated with said communications device; and
means for restricting initiation of packet transmission to transmission initiation intervals associated with said communications device, said transmission initiation intervals associated with said communications device being separated from one another in time by at least N transmission initiation intervals, N being a non-zero integer value.

10. The communications device of claim 9, wherein the duration of said packet transmission initiation interval includes a packet transmission time period and a null period in which no transmission occurs.

11. The communications device of claim 10, wherein transmission of a packet occurs prior to said null period in a packet transmission initiation interval.

12. The communications device of claim 11, further comprising:
means for reducing a value of a transmission back-off counter by one each time a predetermined amount of time passes without a signal from another device being sensed, following one of an unused DIFS or unused EIFS period.

13. The communications device of claim 10, wherein said null period is of a duration equal to a guard period plus one of a EIFS (Extended Inter Frame Spacing) period and a DIFS (Distributed coordination function Inter Frame Spacing) period.

14. The communications device of claim 10, wherein said packet transmission period is limited to a time period which is less than a maximum transmission period permitted by a communications standard used to transmit said packet.

15. The communications device of claim 1, wherein said packet transmission initiation intervals are synchronized in time with regard to packet transmission initiation intervals used by devices within a transmission range of said communications device.

16. A communications device comprising:
at least one processor configured to:
store information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities;
select a subset of transmission initiation intervals to be associated with said communications device; and
restrict initiation of packet transmission to transmission initiation intervals associated with said communications device, said transmission initiation intervals associated with said communications device being separated from one another in time by at least N transmission initiation intervals, N being a non-zero integer value; and
memory coupled to said at least one processor.

17. The communications device of claim 16, wherein the duration of said packet transmission initiation interval includes a packet transmission time period and a null period in which no transmission occurs.

18. The communications device of claim 17, wherein transmission of a packet occurs prior to said null period in a packet transmission initiation interval.

19. The communications device of claim 18, wherein said at least one processor is further configured to:
reduce a value of a transmission back-off counter by one each time a predetermined amount of time passes without a signal from another device being sensed, following one of an unused DIFS or unused EIFS period.

20. A computer program product for use in a communications device, the computer program product comprising:
a non-transitory computer readable medium comprising:
code for causing at least one computer to store information defining a plurality of packet transmission initiation intervals, each of the transmission initiation intervals being of a predetermined duration which is longer than an amount of time required to transmit a packet, said transmission initiation intervals corresponding to a recurring broadcast interval including multiple packet transmission opportunities;
code for causing said at least one computer to select a subset of transmission initiation intervals to be associated with said communications device; and
code for causing said at least one computer to restrict initiation of packet transmission to transmission initiation intervals associated with said communications device, said transmission initiation intervals associated with said communications device being separated from one another in time by at least N transmission initiation intervals, N being a non-zero integer value.

* * * * *